United States Patent
Maruoka et al.

(12)

(10) Patent No.: US 6,309,706 B2
(45) Date of Patent: *Oct. 30, 2001

(54) COATING MATERIAL FOR GOLF BALL AND GOLF BALL COATED WITH THE SAME

(75) Inventors: Kiyoto Maruoka, Kobe; Akihiro Nakahara, Ibaraki, both of (JP)

(73) Assignee: Sumitomo Rubber Industries Limited, Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/359,111

(22) Filed: Jul. 23, 1999

(30) Foreign Application Priority Data

Sep. 8, 1998 (JP) .................................................. 10-254247

(51) Int. Cl.$^7$ ........................................................ B05D 3/02
(52) U.S. Cl. .................................. 427/385.5; 427/393.5; 473/371; 473/377; 473/378
(58) Field of Search ........................ 260/37, 40; 473/351, 473/371, 378, 377; 528/73, 83; 524/872; 427/385.5, 393.5

(56) References Cited

U.S. PATENT DOCUMENTS

| 4,062,825 | * | 12/1977 | Watabe | ................................ 260/37 N |
|---|---|---|---|---|
| 5,409,233 | * | 4/1995 | Kennedy | ........................... 273/235 A |
| 5,461,109 | * | 10/1995 | Blair | ........................................ 524/839 |
| 5,494,291 | * | 2/1996 | Kennedy | ........................... 273/235 A |
| 5,692,974 | * | 12/1997 | Wu | ........................................ 473/377 |
| 5,725,443 | * | 3/1998 | Sugimoto | ............................. 473/378 |
| 5,744,549 | * | 4/1998 | Lutz | ....................................... 525/129 |
| 5,817,735 | * | 10/1998 | Hatch | ....................................... 528/84 |
| 5,820,491 | * | 10/1998 | Hatch | ....................................... 473/378 |
| 5,830,938 | * | 11/1998 | St. Laurent | ........................... 524/317 |
| 5,840,788 | * | 11/1998 | Lutz | ........................................ 524/95 |
| 5,908,358 | * | 6/1999 | Wu | ........................................ 473/378 |
| 6,018,012 | * | 1/2000 | Crast | ........................................ 528/73 |
| 6,096,851 | * | 8/2000 | Maruoka | ................................ 528/85 |

FOREIGN PATENT DOCUMENTS

| 8182775 | 7/1996 | (JP) . |
|---|---|---|
| 959566 | 3/1997 | (JP) . |

* cited by examiner

*Primary Examiner*—Erma Cameron
(74) *Attorney, Agent, or Firm*—Birch, Stewart, Kolasch & Birch, LLP

(57) ABSTRACT

The present invention provides a coating material for a golf ball. The coating material comprises a polyol(1) containing a urethane polyol and a polyisocyanate. The urethane polyol is produced by the reaction between a diisocyanate and a polyol(2) containing as an essential ingredient a diol and a triol at the triol/diol equivalent ratio of 0.2 to 3. The urethane polyol has Mw of 4000 to less than 10000. The coating material is dryable in a short time at low temperatures and forms a coating layer having excellent resistance to scuffing and adhesion to a golf ball main body.

12 Claims, No Drawings

COATING MATERIAL FOR GOLF BALL AND GOLF BALL COATED WITH THE SAME

FIELD OF THE INVENTION

The present invention relates to a coating material for a golf ball which forms a coating layer excellent in resistance to impact and scuffing in both dry and wet conditions, and is dryable in a short time with high productivity; and a golf ball coated with the coating material.

BACKGROUND OF THE INVENTION

A coating layer which encloses a golf ball main body is required to satisfy the following conditions: 1) the coating layer has high impact resistance (i.e., peeling resistance) so that it remains adhered onto the golf ball main body (i.e., the part of the golf ball other than the coating layer) when the golf ball is hit and deforms; and 2) the coating layer has high resistance to scuffing so that it is hard to get scuffed or cracked even when the golf ball is hit with a metal head of a short iron and receives high impact and friction. In general, when a golf ball is hit, it can deform 30% or more in diameter. Therefore, if the coating layer has poor adhesion to the golf ball main body, or has excessively high hardness with poor elasticity, the coating layer does not remain adhered onto the deformed surface of a golf ball main body, resulting in peeling off. On the other hand, if the coating layer is too soft, a problem arises that the coating layer easily gets scuffed or cracked. In addition, the coating layer is required to satisfy the aforementioned requirements not only in a dry condition but also in a wet condition, as a golf ball frequently gets wet during a play on a rainy day. When a golf ball gets wet, foams are generated in the coating layer or in an interface between the coating layer and the golf ball main body. The foams cause to decrease the hardness of the coating layer, or deteriorate the adhesion property between the coating layer and the golf ball main body.

In order to form a coating layer excellent in resistance to impact and scuffing, there has been conventionally developed a urethane-based coating material comprising a polyol as the chief material of the coating material and a polyisocyanate as the curing agent of the coating material. The urethane-based coating material is applied to the surface of a golf ball main body, and then is baked to promote a curing reaction of the polyol with the polyisocyanate.

In general, a golf ball main body has a cover made from an ionomer resin. When an ionomer resin is heated to high temperatures, the ionic bond of the ionomer resin is weakened. Therefore, if the coating material applied to an ionomer resin covered golf ball main body is dried at high temperatures, the elasticity and the hardness of the cover made from the ionomer resin are deteriorated. In that case, a drying process at lower temperature can avoid this deterioation. However, the curing reaction proceeds slowly, and therefore it takes a long time to dry the coating material, resulting in low productivity. For example, Japanese Unexamined Patent Publication No. 8-182775 discloses an urethane-based coating material produced by mixing a polyol and a polyisocyanate in such a manner that the amount of hydroxyl groups of polyol is excessive with respect to the amount of the isocyanate groups of polyisocyanate by molar ratio.

In this publication, in an attempt to improve the adhesion property between the coating layer and the cover of the golf ball, the polyol and polyisocyanate are mixed with each other. However, the urethane-based coating material requires a long drying time, for instance, 24 hours or longer, at 40 to 50° C. This significantly lowers the productivity. In view thereof, it is desirable to produce an urethane-based coating material, which can be dried in a short time at a sufficiently high temperature to avoid the deterioration of the main body of the golf ball.

Recently, there has been developed an urethane-based coating material comprising a urethane polyol as the chief material. Urethane polyol belongs to a class of polymer polyol, because urethane polyol has urethane bonds in its main chain and has hydroxyl groups as end-groups. For example, Japanese Unexamined Patent Publication No. 9-59566 discloses a coating material for a golf ball including a urethane polyol. The urethane polyol has a weight-average molecular weight (hereinafter referred to as "Mw") of 10000 to 50000. However, this coating material adheres poorly to the surface of a golf ball main body. This is because the coating material has a smaller amount of free hydroxyl groups and free isocyanate groups than the ordinary urethane-based coating material, and therefore the coating material does not sufficiently react with the surface of the golf ball main body. The problem of poor adhesion becomes significant when the coating material is applied to a one-piece type golf ball main body which has a rubber core made of conventional rubber but no ionomer cover. Because the conventional rubber is less reactive than ionomer with a coating material. In the case of a one-piece type golf ball, a drying process at high temperatures also cannot be employed because the physical properties of the rubber core will likely deteriorate.

SUMMARY OF THE INVENTION

An object of the present invention is to provide a coating material for a golf ball which is dryable in a short time at relatively low temperatures and forms a coating layer having excellent resistance to scuffing and good adhesion to a golf ball main body in both dry and wet conditions; and a golf ball coated with the same.

In order to fulfil the above object, according to an aspect of the invention, a coating material for a golf ball comprises a polyol(1) containing a urethane polyol and a polyisocyanate. The urethane polyol is produced by the reaction between a diisocyanate and a polyol(2). The polyol(2) contains a diol and a triol as an essential ingredient with the triol/diol equivalent ratio of 0.2 to 3. The urethane polyol has weight-average molecular weight in a range of 4000 inclusive to 10000 exclusive.

According to another aspect of the invention, a golf ball includes a main body and a coating layer formed by applying to the surface of the main body the coating material of the present invention.

DETAILED DESCRIPTION OF THE PREFERRED EMBODIMENTS OF THE INVENTION

A coating material for a golf ball according to the present invention is a urethane-based coating material including a chief material and a curing agent. First, the chief material will be described.

The chief material includes a polyol as a main component. The polyol contains a urethane polyol described below in the amount of 50 weight % or more based on the total weight of the polyol.

The urethane polyol has urethane bonds in its main chain made by the condensation of a diisocyanate with a specific polyol, and the urethane polyol has hydroxyl groups as its end-groups. The specific polyol is characterized in that the specific polyol contains triol and diol as an essential ingredient and has the equivalent ratio of triol to diol (i.e.,triol/diol ratio) being from 0.2 to 3. The urethane polyol has Mw of 4000 to less than 10000.

Hereinafter the reason why the specific polyol is necessary to produce the urethane polyol will be described. Triol reacts with diisocyanate to form a rigid urethane because of its network structure of urethane. The thus obtained urethane polyol has a great modulus and a high tensile strength. When the urethane polyol having rigid urethane is present in a coating material, the coating layer having a high resistance to scuffing is produced. On the other hand, the more the urethane portion forming network structure is included in the coating layer, the lower the maximum value of elongation of the layer becomes as well as lowering the softness of the layer. In fact, the coating layer with lower softness and elongation is liable to cause cracking and/or peeling. When using a diol with a triol in order to produce a urethane polyol, the resulting urethane polyol has partially a network structure. The urethane polyol is capable of forming a coating layer having well balanced properties, namely elongation and hardness. This is because the equivalent ratio of triol to diol should fall in the range of 0.2 to 3.0, preferably 0.3 to 2.3, more preferably 1.0 to 2.3. The use of the urethane polyol can provide a coating layer having resistance to both peeling and scuffing, although these are contrary properties.

A diol and a triol are used for producing the urethane polyol. As the diol, the following may be used, but not limited thereto: ethylene glycol, diethylene glycol, triethylene glycol, butylene glycol, 1,3-butanediol, 1,4-butanediol, neopentyl glycol , 1.6-hexane glycol , and so on. As the triol, the following may be used, but not limited thereto: glycerine, trimethylol propane, hexanetriol, and so on. A polymer polyol having only two or three hydroxyl groups in a macromolecule may also be used as a diol or a triol. Examples of polymer polyol include: polyether polyol obtained by the reaction between an initiator having active hydrogen and alkylene oxide; condensed polyester polyol obtained by the dehydration and condensation between dibasic acid such as adipic acid and glycol or triol; lactone-based polyester polyol obtained by the ring-opening polymerization of lactone such as $\epsilon$-caprolactone; polycarbonate diol obtained from cyclic diol; and acrylpolyol obtained by properly introducing hydroxyl groups into acrylic copolymer. Examples of polyether polyol include polyethylene glycol, polypropylene glycol, and polytetramethylene glycol. Examples of condensed polyester polyol include polyethylene adipate. Examples of lactone-based polyester polyol include poly-$\epsilon$-caprolactone.

A diisocyanate is used for producing the urethane polyol. Examples of the diisocyanate include aliphatic, alicyclic, and aromatic diisocyanate compounds (i.e., aromatic diisocyanate compounds with or without isocyanate on their side chains) such as hexamethylene diisocyanate (HDI), xylylene diisocyanate (XDI), hydrogenated xylylene diisocyanate ($H_6XDI$), isophorone diisocyanate (IPDI), tetramethyl xylylene diisocyanate (TMXDI), and hydrogenated diphenylmethane diisocyanate ($H_{12}MDI$). In particular, preferable example is non-yellowing diisocyanate (i.e., aliphatic or alicyclic diisocyanate), because of its high weather resistance.

In a preferred production of the urethane polyol, the diisocyanate and the polyol are used at the equivalent ratio of isocyanate group(NCO) to hydroxyl group (OH) of 0.4 to 0.9. At the NCO/OH ratio of less than 0.4, urethane polyol is produced which has insufficient Mw to shorten the drying time. At the NCO/OH ratio of more than 0.9, produced is the urethane polyol having excessive Mw that likely resulting in gel. In addition, when urethane polyol having excessively high Mw is used, adhesion of the coating layer to the surface of a golf ball main body is likely lessened.

Preferably, the urethane polyol has urethane bonds of 0.1 to 5 mmol/g with respect to 1 gram of the urethane polyol. The strength of the coating layer depends on the amount of urethane bond. With urethane bonds amounting to less than 0.1 mmol/g, the concentration of the urethane in the coating layer becomes too small. Such a coating layer has poor resistance to scuffing. With urethane bonds amounting to greater than 5 mmol/g, the coating layer has excessively high hardness. Such a coating layer does not remain adhered onto the deformed surface of a golf ball main body, resulting in checking or cracking in the coating layer.

The urethane polyol has Mw of 4000 or more, preferably about 4500 or more and has Mw of below 10000, preferably about 9000 or less for the following reason. When Mw of the urethane polyol is less than 4000, it requires a long time for drying the coating material. In this case, the coating workability and productivity of golf balls are lowered. When Mw of the urethane polyol is 10000 or greater, the hydroxyl value of the urethane polyol becomes relatively small. In this case, the coating material does not have sufficient affinity with the surface of a golf ball main body, and they do not sufficiently adhere to each other. A proper adhesion to each other even in a wet condition may be achieved by the use of a urethane polyol having Mw of 9000 or less.

The urethane polyol is produced by the following steps. First, a specific polyol is prepared by mixing a diol and a triol at the triol/diol ratio of 0.2 to 3.0. The specific polyol is diluted with solvent, and then is mixed with a reaction catalyst (for example, dibutyltin laurate). To the resultant mixture, a diisocyanate is added gradually to form urethane bonds. The amount of urethane bonds in the urethane polyol is adjustable by varying the trioi/diol equivalent ratio in the specific polyol or the mixing ratio between the specific polyol and the diisocyanate.

According to a preferred embodiment, a polyol as the chief material of the present invention is the above-mentioned urethane polyol itself. However, the chief material may contain polyol other than the urethane polyol.

The other polyol contained with the urethane polyol in the chief material may be selected from the following polyols used for producing the urethane polyol: low Mw diol such as ethylene glycol, diethylene glycol, triethylene glycol, butylene glycol, 1,3-butane diol, 1,4-butane diol, neopentyl glycol, and 1,6-hexane diol; low Mw triol such as glycerin, trimethylol propane, and hexane triol; polymer polyol such as polyether polyol (e.g. polyethylene glycol, polypropylene glycol, and polytetramethylene glycol), condensed polyester polyol, lactone-based polyester polyol, polycarbonate diol, and acryl polyol.

When the chief material of the coating material contains the other polyol except the urethane polyol, the urethane polyol is present in the chief material preferably in the amount of 50 weight % or more, and more preferably 80 weight % or more based on the total weight of polyol. When the amount of the urethane polyol is less than 50 weight %, two requirements cannot be met at the same time. One of the requirements is to dry in a short time and the other is to produce the coating layer with desired properties. The latter requirement may be satisfied by the use of the chief material, which contains low Mw diol and low Mw triol at the triol/diol ratio of 0.2 to 3.0. However, the thus-obtained coating material cannot satisfy the former requirement, because cure time of the coating material is longer than the coating material of the present invention.

The curing agent in the coating material of the present invention is a polyisocyanate. Specifically, the curing agent is selected from the following polyiscyanates: aliphatic, alicyclic, aromatic, and aromatic diisocyanate compounds (i.e., aromatic diisocyanate compounds with or without isocyanate on their side chains) such as hexamethylene diisocyanate (HDI), xylylene diisocyanate (XDI), hydrogenated xylylene diisocyanate ($H_6XDI$), isophorone diisocyanate (IPDI), tetramethylxylylene diiusocyanate (TMXDI), and hydrogenated diphenyl methane diisocyanate ($H_{12}MDI$). Especially preferable is a non-yellowing polyisocyanate (i e., aliphatic or alicyclic diisocyanate compound). These polyisocyanates may be used alone or in combination of two or more of them.

If necessary, the coating material of the present invention may further include additives which are generally contained in a coating material for a golf ball such as a silicon-based slipping agent, a leveling agent, a viscosity regulator, a fluorescent brightening agent, a blocking inhibitor, a curing catalyst, and a color pigment. These additives are added to the chief material or the curing agent.

The chief material and the curing agent are mixed together into the coating material immediately being before applied to a golf ball main body in such a manner that the equivalent ratio of the isocyanate groups (NCO) of the curing agent with respect to the hydroxyl groups (OH) of the chief material (i.e., NCO/OH ratio) is 0.9 to 1.5, and preferably 1.1 to 1.3. When the NCO/OH ratio is less than 0.9, the resultant coating layer is so sticky that dust or blot is liable to adhere to the coating layer. When the NCO/OH ratio is more than 1.5 , some isocyanate groups in the curing agent remain unchanged in the produced coating layer. The isocyanate groups can react with water to produce carbon dioxide, thereby generating bubbles in the coating layer.

The coating material of the present invention is applied on the surface of the golf ball main body to form a coating layer. In addition, the coating material may also be used as a primer coating material for the surface of a ball main body, and further as a clear coating material for the surface of a ball main body coated with a primer coating material. The coating material is applicable to a golf ball having the surface made from the composition comprising carboxylic acid. Examples of the composition for the surface of the golf ball include: a rubber composition for one-piece type golf ball comprising butadiene rubber (preferably high cis-1,4-bond content butadiene rubber) unsaturated carboxylic acid and organic peroxide; a thermoplastic resin composition comprising ionomer resin for a cover of a multi-piece type golf ball. The coating material is applicable to a thread-wound golf ball as well as a solid golf ball.

The coating material of the present invention is applied to the surface of a golf ball by the conventional coating methods for two-part coating material (e.g., the chief material and the curing agent). For example, a golf ball main body is subjected to surface treatment such as washing. Then, the chief material and the curing agent are mixed to prepare the coating material. The obtained coating material is sprayed over the surface of the golf ball main body by way of air spraying with gun or by way of electrostatic spraying. When the coating material is applied by air spraying with a gun, the coating material is preferably prepared by the following steps. A small amount of both the chief material and the curing agent may be mixed together, and this step is repeated. Alternatively, the chief material and the curing agent are continuously conveyed through their respective channels by their respective pumps to a mixer such as a static mixer provided immediately upstream of the spray gun, and they are mixed together at a constant ratio in the mixer. Furthermore, the chief material and the curing agent may be mixed together at a ratio controlled by a mixing ratio controller provided to the air spraying system.

After being applied, drying of the coating material of the present invention can be finished within about 0.5 to 2 hours at a temperature of 50° C. or lower. This is because the coating material comprises the above-mentioned urethane polyol in the amount of 50 weight % or more based on the total weight of polyol. Drying at low temperatures in a short time like this does not damage the cover made from thermoplastic resin such as ionomer. In addition, there is almost no adverse influence on the physical properties of the golf ball with the surface made from rubber. Furthermore the thus-obtained coating layer has a high resistance to impact and scuffing, and keeps the proper adhesion to the golf ball main body in both dry and wet conditions. Coated with the coating layer, the golf ball has high resistance to impact and scuffing.

EXAMPLES

[Evaluation Method]

The properties of the coating layer made from a coating material was evaluated as follows.

(1) Drying Property

The coating material was applied to the surface of a golf ball main body and was dried by heating at 50° C. After drying for 1 hour, 3 hours, or 10 hours, the applied coating material, i.e. a coating layer was touched to see whether the layer was sticky or not. The golf balls with the coating layer were classified into three categories in accordance with the drying time as follows:

◯: drying for 1 hour, curing was finished and the obtained coating layer was not sticky;

Δ: drying for 3 hours, curing was finished ; and

×: drying for 10 hours, curing was finished.

(2) Adhesion in a Dry Condition

The coating material was applied and dried on the surface of a golf ball main body. Thus-obtained golf balls were hit one hundred times, and then were visually inspected to see the state of peeling and cracking/checking. The golf balls were classified into three categories in accordance with the state of peeling and cracking as follows:

a) cracking/checking

◯: no cracking/checking was observed;

Δ: cracking/checking was observed in size of below 1 mm; and

×: cracking/checking was observed in size from 1 to 5 mm.

b) peeling

◯: no peeling was observed;

Δ: peeling was observed in an area of below 0.5 $cm^2$ in total; and

×: peeling was observed in an area of 0.5 $cm^2$ or larger.

(3) Adhesion in a Wet Condition

The coating material was applied and dried on the surface of a golf ball main body. Thus-obtained golf balls were soaked in water for one week, and then evaluated for its peeling state in the same manner as a dry condition.

(4) Resistance to Scuffing

After drying, the golf balls were executed by sand blasting for 5 minutes. After sand blasting, the golf balls were visually inspected to see the state of the coating layer, and then classified into three categories in accordance with the state of the layer as follows:

◯: no peeling was observed;

Δ: coating layer at the dimple edge was worn in such a state that the surface of the ball main body was exposed; and ×: coating layer at the bottom of some dimples was peeled.

(5) Extension Property

A tensile strength at breaking (hereinafter TB) and an elongation until breaking (hereinafter EB) are measured and evaluated as follows. First the coating material was applied to glass board and was cured. Cured coating layer was stripped and thereby polyurethane film having thickness of 0.5 mm was obtained. The polyurethane film was cut to form No.4 dumbbell specimens. A tensile test was performed according to JIS K6301. The tensile strength and the elongation at breaking were respectively measured as TB and EB. In addition, 50% modulus was measured at the tensile rate of 50 m/min. The greater values of TB and EB are preferred for better properties of the coating layer. Preferable value of TB is 100 kg/cm$^2$ or greater, more preferably 160 kg/cm$^2$ or greater, further more preferably 390 kg/cm$^2$ or greater. Preferable value of EB is 80% or greater, more preferably 90% or greater, further more preferably 110% or greater.

[Preparation of Coating Material]

(1) Preparation of the Chief Material

In the following preparation, polytetramethylene glycol (Mw is 650) manufactured by BASF Co. Ltd. was used as diol and trimethylol propane manufactured by Koei Kagaku Co.Ltd. was used as triol. Desmodule (trade name of isophorone diisocyanate manufactured by Sumitomo Bayern Co. Ltd.) was used as diisocyanate.

A mixture of diol and triol at the equivalent ratio shown in Table 1 was diluted with methyl ethyl ketone as a solvent, and therein was added dibutyltin laurate as a curing catalyst. Thus-obtained polyol solution was heated and isophorone diisocyanate was added dropwise at the NCO/OH ratio shown in Table 1. The resultant urethane polyol was used as the chief material of the coating material "a". Repeating this procedure, chief materials of the coating materials "b–j" respectively were obtained. In these preparations, the solvent was added in an amount of 40 parts by weight and the catalyst of 0.03 parts by weight based on the total weight of diol, triol, and diisocyanate.

(2) Curing Agent

Hexamethylene diisocyanate, N3500 (product of Sumitomo Bayer Urethane Co. Ltd.) was used.

(3) Preparation of Coating Material

The coating materials "a–j" were prepared respectively by the following steps.

The chief material and the curing agent were loaded into an air gun in such a manner that the equivalent ratio of the isocyanate groups of the curing agent to the hydroxyl groups of the chief material (i.e., NCO/OH) is 1.2. The mixture was stirred for one minute, and as a result, the coating materials were obtained. Extension properties of coating materials "a–j" were measured respectively and the results are shown in Table 1.

[Evaluation of Coating Materials]

As the triol/diol ratio increased (i.e. triol content increased in polyol for urethane polyol), 50% modulus and TB increased, but EB decreased. Coating material "j" produced by the use of polyol at the triol/diol ratio being more than 3.0 was not employed as a coating material for a golf ball because EB was less than 80. Coating material "g" produced by the use of polyol at the triol/diol ratio being less than 0.2 was not employed as a coating material for a golf ball because TB was less than 80.

As can be seen from the results of coating materials "b", "c" and "k", TB has a tendency to increase as Mw of the urethane polyol increases. From the results of coating materials "a" and "h", as Mw of the urethane polyol increases, 50% modulus and TB has a tendency to increase although EB has a tendency to decrease. These tendencies indicate that the extension property is variable according to the Mw of the urethane polyol, when the urethane polyol has the constant triol/diol ratio.

[Production of Golf Ball]

The composition shown in Table 2 was compressed and vulcanized at 160° C. for 20 minutes to form the main bodies of one-piece type golf balls. Each main body had a diameter of 43 mm and 360 dimples.

The composition shown in Table 2 was compressed and vulcanized at 160° C. for 20 minutes to form rubber cores having diameter of 38.4 mm. On the other hand, mixed were 50 parts by weight of Himilan 1605 (sodium neutralized ethylene-methacrylic acid copolymer-based ionomer: a product of Mitsui DuPont Chemical Co., Ltd.), 50 parts by weight of Himilan 1706 (zinc neutralized ethylene-methacrylic acid copolymer-based ionomer: a product of Mitsui DuPont Chemical Co., Ltd.), and two parts by weight of titanium oxide to form a cover. The core was covered with the cover made from the composition above, and as a result, two-piece golf ball main bodies having a diameter of 43 mm were obtained.

TABLE 2

|  | Core for Two-piece type golf ball | One-piece type golf ball main body |
|---|---|---|
| Butadiene rubber | 100 | 100 |
| Zinc acrylate | 36 | 25 |
| Zinc oxide | 3 | 3 |
| Barium sulfate | 16 | 12 |
| Dicumyl peroxide | 1 | 2 |

On the surface of a golf ball main body, one of the coating materials "a–j" was sprayed by the air gun in the state where the air gun was moved upward and downward while the golf ball main body was rotated. The coating material was applied in an amount of 100 mg. As a result, golf balls No.1–17 were obtained. Golf balls Nos.1–7, 16 and 17 were classified into Examples. Golf balls Nos.8–11 and 12–15 were classified into Comparative Examples.

The adhesion and drying properties of golf balls Nos.1–17 were evaluated by the above-mentioned evaluation methods.

TABLE 1

|  | Coating material | a | b | c | d | e | f | g | h | i | j | k |
|---|---|---|---|---|---|---|---|---|---|---|---|---|
| Urethane polyol | Triol/diol Equivalent ratio | 0.3 | 1.0 | 1.0 | 1.5 | 2.3 | 3.0 | 0.1 | 0.3 | 0.6 | 3.3 | 1.0 |
|  | NCO/OH Equivalent ratio | 0.6 | 0.5 | 0.7 | 0.6 | 0.6 | 0.6 | 0.6 | 0.9 | 0.8 | 0.6 | 0.4 |
|  | Mw | 6305 | 4053 | 9881 | 7105 | 7540 | 8201 | 3030 | 18131 | 10921 | 8830 | 3130 |
| Extension | 50% modulus (kg/cm$^2$) | 121 | 171 | 184 | 274 | 305 | 331 | 47 | 181 | 223 | 391 | 203 |
|  | TB (%) | 169 | 395 | 445 | 413 | 420 | 415 | 94 | 384 | 405 | 401 | 274 |
|  | EB (%) | 145 | 125 | 121 | 113 | 91 | 85 | 165 | 128 | 107 | 40 | 118 |

The evaluation results for two-piece type golf balls Nos.1–11 were shown in Table 3, and the evaluation results for one-piece type golf balls No.12–17 were shown in Table 4.

TABLE 3

| Two-piece type golf ball No. | 1 | 2 | 3 | 4 | 5 | 6 | 7 | 8 | 9 | 10 | 11 |
|---|---|---|---|---|---|---|---|---|---|---|---|
| Coating material | a | b | c | d | e | f | g | h | i | j | k |
| Mw of urethane polyol | 6305 | 4053 | 9881 | 7105 | 7540 | 8201 | 6030 | 18131 | 10921 | 8830 | 3130 |
| Drying property | ○ | ○ | ○ | ○ | ○ | ○ | ○ | ○ | ○ | ○ | X |
| Adhesion in a dry condition   Cracking | ○ | ○ | ○ | ○ | ○ | ○ | ○ | ○ | ○ | X | ○ |
| Adhesion in a dry condition   Peeling | ○ | ○ | ○ | ○ | ○ | ○ | ○ | X | Δ | Δ | ○ |
| Adhesion in a wet condition   peeling | ○ | ○ | ○ | ○ | ○ | ○ | ○ | X | Δ | ○ | ○ |
| Resistance to scuffing | ○ | ○ | ○ | ○ | ○ | ○ | X | Δ | ○ | ○ | ○ |

TABLE 4

| One-piece type golf ball No. | 12 | 13 | 14 | 15 | 16 | 17 |
|---|---|---|---|---|---|---|
| Coating material | b | d | e | g | h | j |
| Mw of urethane polyol | 4053 | 7105 | 7540 | 6030 | 18131 | 8830 |
| Drying property | ○ | ○ | ○ | ○ | ○ | ○ |
| Adhesion in a dry condition   Cracking | ○ | ○ | ○ | ○ | ○ | X |
| Adhesion in a dry condition   peeling | ○ | ○ | ○ | ○ | X | X |
| Adhesion in a wet condition   peeling | ○ | ○ | ○ | ○ | X | ○ |
| Resistance scuffing | ○ | ○ | ○ | X | Δ | ○ |

[Evaluation]

As can be seen from Table 3, when the urethane polyol has too low Mw, the drying property is poor (see No.11). Contrary to this, from the results of Nos.8 and 9, when the urethane polyol has excessively high Mw, the adhesion property is poor and scuffing resistance is deteriorated. From the results of Nos.7–10, as the triol/diol ratio is increased, the adhesion in a dry condition has a tendency to deteriorate, although scuffing resistance has a tendency to improve. Coating material "g", having triol/diol ratio less than 0.1, is not suitable for a coating material for a golf ball because a sufficient resistance to scuffing is not given to a golf ball (see No.7). Although providing a golf ball with a sufficient resistance to scuffing (see No.10), coating material "j" having triol/diol ratio more than 3.0, also is not suitable for a coating material for a golf ball, because coating material "j" does not provide a golf ball with a proper adhesion property in a dry condition. Therefore coating materials "a–f" having triol/diol ratio between 0.2 and 3.0, are suitable for a coating material for a golf ball because they provide golf balls with necessary properties.

Comparing the result of No.17 (one-piece type golf ball) with the result of No.10 (two-piece type golf ball), it is found that one-piece type golf ball has worse adhesion property in a dry condition than two-piece type golf ball. The reason is believed that a one-piece type golf ball is deformed easier than a two-piece type golf ball having a hard cover made from ionomer. However the coating layer made from the coating material "j" dose not have enough EB to adhere to the deformed surface of a one-piece type golf ball. On the other hand, comparing the result of one-piece type golf balls (No.15,16) with the results of two-piece type golf balls (No.7,8), the same results of one-piece type golf balls as of two-piece type golf balls is found. Therefore it appears that the adhesion property is not greatly affected by the surface material of a golf ball main body, in the case of low triol content in the polyol for urethane polyol. Also it appears that a drying property is not affected by the surface material of a golf ball.

Although the present invention has been fully described by way of example, it is to be understood that various changes and modifications will be apparent to those skilled in the art. Therefore, unless otherwise such changes and modifications depart from the scope of the present invention, they should be construed as being included therein.

What is claimed is:

1. A method of manufacturing a golf ball comprising the steps of:
    (a) providing a main body;
    (b) preparing a coating material which includes polyisocyanate and a first polyol including a urethane polyol; and
    (c) reacting a diisocyanate and a second polyol containing diol and triol as essential ingredients with triol/diol equivalent ratio being 0.3 to 3 to prepare said urethane polyol, the urethane polyol having a weight-average molecular weight in a range of 4000 inclusive to 10000 exclusive; and
    (d) applying said coating material on the surface of the main body to provide a coating layer made from said coating material.

2. A golf ball manufactured by the method of claim 1.

3. A method of manufacturing a golf ball according to claim 1 further comprising the step of drying the coating material at 50° C. or lower for 0.5 to 2 hours.

4. The method of manufacturing a golf ball according to claim 1, further comprising the main body constituted in a one-piece structure having a core including a rubber as a main component.

5. The method of manufacturing a golf ball according to claim 1, further comprising the main body constituted in a multi-piece structure having a core and an ionomer cover covering the core.

6. The method of manufacturing a golf ball according to claim 1, further comprising the feature that the first polyol is substantially the urethane polyol.

7. The method of manufacturing a golf ball according to claim 6, wherein the equivalent ratio of the isocyanate groups of the polyisocyanate to hydroxyl groups of the first polyol is 0.9 to 1.5.

8. The method of manufacturing a golf ball according to claim 1, wherein the equivalent ratio of the isocyanate groups of the diisoyanate to hydroxyl groups of the second polyol is 0.4 to 0.9.

9. The method of manufacturing a golf ball according to claim 1, wherein the urethane polyol has a weight-average molecular weight of 4500 to 9000.

10. The method of manufacturing a golf ball according to claim 1, wherein the coating material comprises a first polyol wherein the urethane polyol is 50%, or more by weight, based on the weight of the first polyol.

11. The method of manufacturing a golf ball according to claim 1, wherein the urethane polyol has a weight-average molecular weight of from 6305 inclusive to 10,000 exclusive.

12. The method of manufacturing a golf ball according to claim 1, wherein the urethane polyol has a weight-average molecular weight of from 5000 exclusive to 10,000 exclusive.

* * * * *